Nov. 18, 1930. W. PALMER 1,782,366
METHOD OF AND APPARATUS FOR PRODUCING FIRE EXTINGUISHING FOAM
Filed Oct. 7, 1925 2 Sheets-Sheet 1
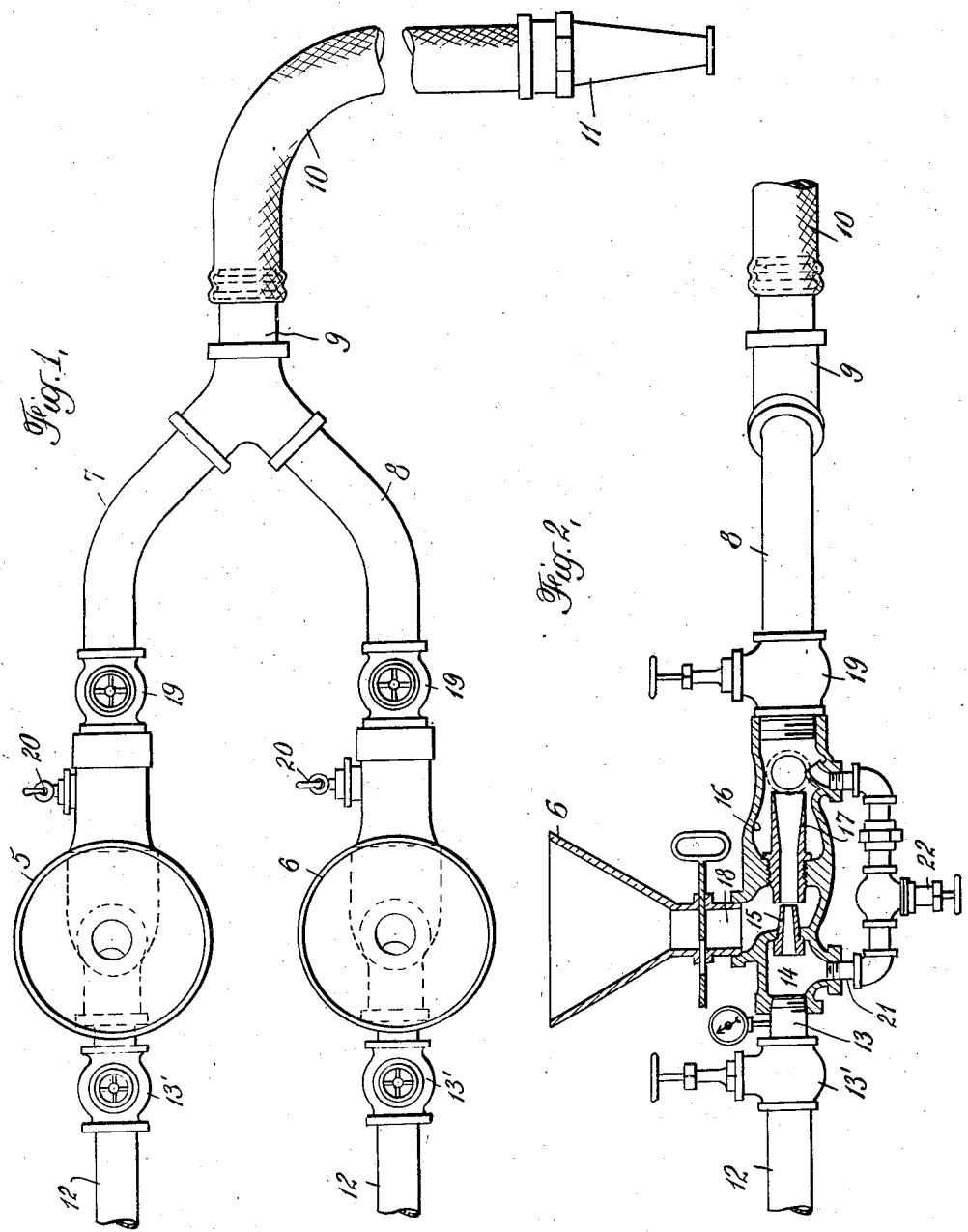
INVENTOR
Walter Palmer
BY
Pennie Davis Marvin & Edmonds
his ATTORNEYS Nov. 18, 1930.    W. PALMER    1,782,366
METHOD OF AND APPARATUS FOR PRODUCING FIRE EXTINGUISHING FOAM
Filed Oct. 7, 1925    2 Sheets-Sheet 2
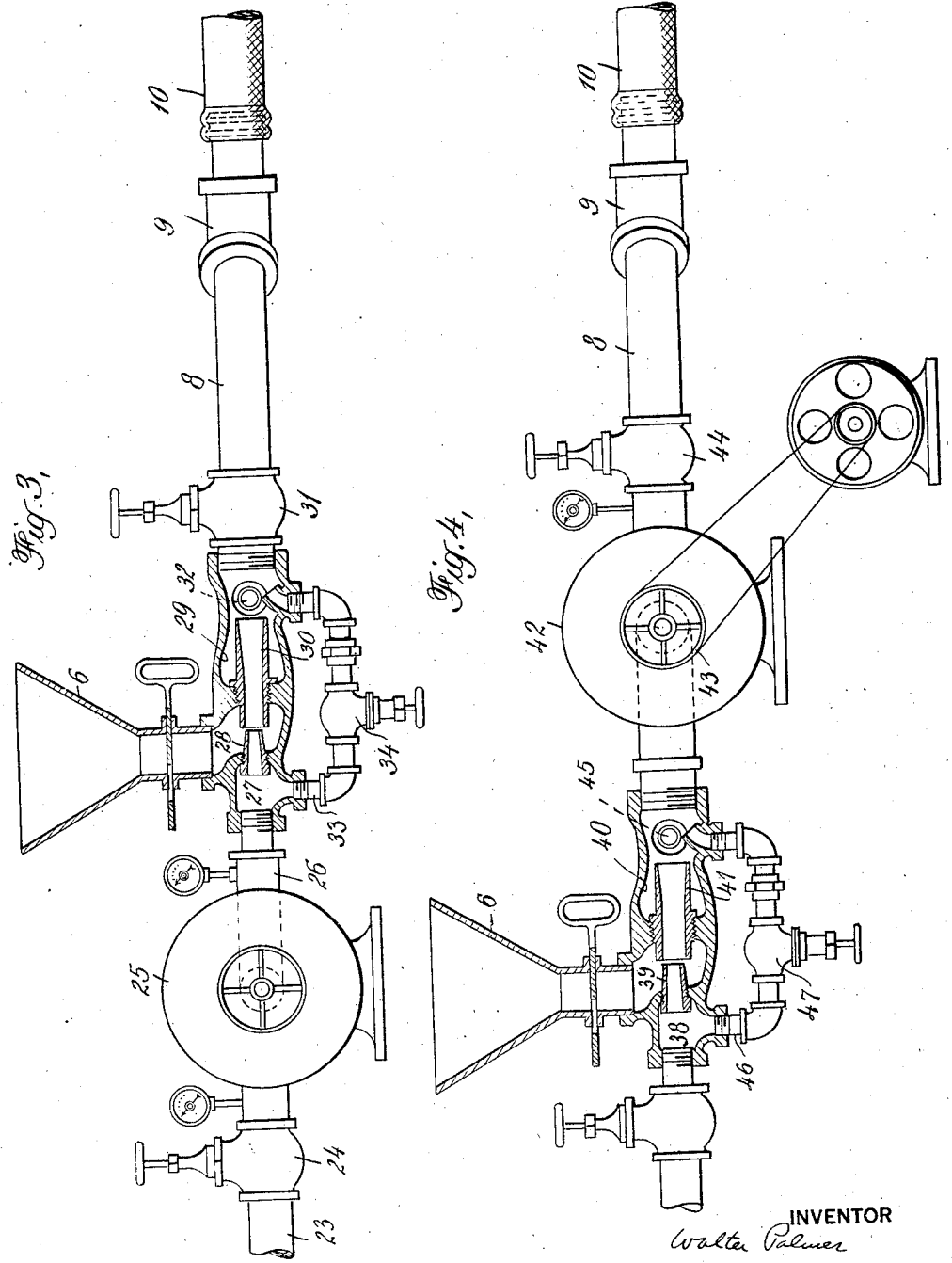
INVENTOR
Walter Palmer
BY
his ATTORNEYS Patented Nov. 18, 1930

1,782,366

UNITED STATES PATENT OFFICE

WALTER PALMER, OF CHESTER, PENNSYLVANIA, ASSIGNOR TO AMDYCO CORPORATION, OF NEW YORK, N. Y., A CORPORATION OF NEW YORK

METHOD OF AND APPARATUS FOR PRODUCING FIRE-EXTINGUISHING FOAM

Application filed October 7, 1925. Serial No. 61,004.

This invention relates to fire protection, and particularly to a method of and apparatus for producing fire-extinguishing foam.

Foam for fire-extinguishing use has been produced heretofore by combining solutions containing the necessary ingredients to generate a gas such as carbon dioxide which is entrained in a mass of bubbles. The ordinary ingredients are sodium bicarbonate and aluminum sulphate. These materials are dissolved in separate solutions and the foam stabilizer is added to one of them. The stabilizer may be an extract of licorice root or of oak bark or other material having the property of increasing the surface tension of the bubbles so that the foam will have lasting qualities. The production of foam in this way, except in the case of small hand-extinguishers, requires the installation and maintenance of comparatively large and expensive tanks and frequent inspection of the solutions to ensure that the foam-forming system is in satisfactory condition. Furthermore, the amount of foam which can be produced depends upon the quantities of the respective solutions which are stored. When one of the solutions is exhausted production of foam ceases necessarily.

It is the object of the present invention to avoid the necessity of maintaining chemical solutions in tanks and to provide a method of and apparatus for producing foam efficiently in a substantially continuous manner by combining separated dry materials with water as hereinafter described.

Other objects and advantages of the invention will be apparent as it is better understood by reference to the following specification and accompanying drawing; in which Fig. 1 is a plan view of an apparatus adapted for use in carrying out the invention;

Fig. 2 is a side elevation partially in section of one of the mixing units;

Fig. 3 is a similar view of a slightly different unit; and

Fig. 4 similarly illustrates another form of unit.

In carrying out the invention the essential ingredients of a foam-forming mixture are embodied in two dry materials or reagents. One may consist of sodium bicarbonate with the addition of a suitable proportion of a dry pulverulent extract of licorice root or oak bark or other material which is capable of increasing the surface tension of the foam bubbles. The other may consist of aluminum sulphate. These materials are stable and they can be stored safely so long as they are dry an unmingled. When the materials are dissolved in water in the proper proportions and the two solutions are brought together a tough foam is formed which can be spread as a blanket over a burning surface. The foam blanket excludes oxygen of the atmosphere from the surface and quickly extinguishes the fire.

In its preferred form the present invention involves a regulated introduction of dry materials in a separated condition and in substantially constant proportions with respect to each other, and jointly substantially constant with respect to the two branches of a flowing stream of water and the mingling of the branch streams to produce the reaction. The dry materials do not mix readily with water, but I have discovered that they can be satisfactorily incorporated therein if the dry materials are subjected to suction at the points of introduction thereof to the water. Only portions of the dry materials are dissolved prior to the point of intermingling so that the mingling of the streams with some of each reagent dissolved and with particles carried in suspension results in the production of foam and the conveying of the mixture and foam and undissolved particles of the reagents through the conduit to the point of discharge to thereby effect further dissolving and reaction in transit through the conduit. Apparently the suction has the effect not only of causing the dry material to flow and consequently to be fed continuously to the stream, but also of reducing temporarily the pressure of the water which might otherwise tend to cause it to flow into the inlets through which the dry material is admitted. By thus avoiding contact of the dry material with the water except as it is actually incorporated in the flowing streams, it is possible to maintain continuous streams containing uniform proportions of the dry materials dissolved therein and to produce a satisfactory foam by mingling these streams. The consistency of the foam can be varied by changing the degree of suction which is applied at the point of introduction of the dry materials and the proportions of these materials which are introduced to the streams of water can be governed likewise. The production and variation of the suction applied at the point of introduction of the dry materials can be accomplished in a variety of ways and furnishes the necessary control of the foam to ensure its application in proper condition for the accomplishment of the intended object. The consistency of the foam can be varied also by the addition of water at the point where the two solutions are brought together.

It is possible to apply suction to the dry materials by employing ejectors through which streams of water under suitable pressure are caused to flow. The water can be obtained from any usual source such as a hydrant or stand-pipe so that the two streams referred to are in fact merely branches of a single stream as stated. Hydrant water is available often at pressures which will permit the production of satisfactory foam. The dry material can be supplied from suitable hoppers which are connected through inlets to the suction chambers of the ejectors. The hoppers may be provided with agitators to ensure uniform flow of the dry materials. In the ejectors the pressure of the water is reduced to substantially atmospheric pressure and at the same time a partial vacuum is created in the suction chambers and is relieved by the flow of dry materials into the streams of water. The ejectors act also as mixers causing the dry material to be incorporated thoroughly with the water so that the maximum efficiency of operation is assured. The streams of solutions produced by the ejectors can be brought together by a suitable Y-connection or other arrangement of pipes which will unite the two branch streams in a single conduit. At the point where the solutions are mingled the foam forms and the pressure developed by the expansion of the gas bubbles is sufficient to direct a stream of the foam over an effective distance of from seventy to eighty feet or to lift a column of foam to a height of forty feet or more. The foam is applied by causing it to flow over the burning surface.

Another form of apparatus which is particularly suitable where the water pressure is low includes pumps as auxiliaries to the ejectors. Centrifugal or positive rotary pumps can be used. In one form of the invention the pumps are applied to boost the pressure of the water before it enters the ejectors and thus to increase the degree of available vacuum. In the other case the pumps are applied at the opposite sides of the ejectors so that the suction effect of the pumps is added to that created by the ejectors as the result of the flow of water under pressure therethrough. The use of pumps avoids the possibility of back pressure at the point where the dry materials are introduced. In either case the result is substantially the same because the suction applied to the dry materials causes it to enter and mingle with the flowing streams while the pressure of the water is reduced at the point where the dry materials enter the streams. By varying the effective suction exerted upon the dry materials by the ejectors or pumps or both the proportions of dry materials and water can be modified to permit the production of wet or dry foam with all of the intervening degrees of consistency which may be adapted particularly in special applications of the foam to accomplish the purpose thereof.

Referring to Fig. 1 of the drawing, 5 and 6 indicate the hoppers which are adapted to receive the dry materials consisting, for example, respectively of sodium bicarbonate with the addition of a foam stabilizer and aluminum sulphate. The hoppers are filled with these materials and the supply thereof is replenished from time to time as may be necessary to maintain the apparatus in continuous operation. The separated dry materials are fed to streams of water by the means hereinafter more fully described and mingling with the water form solutions which pass through the pipes 7 and 8. These pipes are joined to a conduit 9 in which the streams of solutions mix. At this point the foam is formed by the reaction between the solutions and the foam is conveyed through the conduit to the hose 10 and is delivered through a nozzle 11 whereby it may be directed upon the burning surface.

The means employed for mingling the separated dry materials with the streams of water are identical in the case of both materials and are illustrated in Figs. 2, 3 and 4. Referring to Fig. 2, 12 indicates pipes leading from a source of water under pressure of, for example, one hundred pounds per square inch. Pressure-reducing valves 13 are disposed in the pipes to permit control of the streams. Ejectors 14 are connected to the pipes 13 and are provided with nozzles 15, suction chambers 16 and nozzles 17. The hoppers 5 and 6, which are adapted to contain the dry material, communicate through openings 18 with the suction chambers. Outlet pipes 7 and 8 deliver the solutions from the suction chambers to the conduit 9. Valves 19 may be placed in the pipes 7 and 8 so that water can be forced into the hoppers 5 and 6 to clear them of accumulations of dry material. Test cocks 20 may be introduced to permit withdrawal and inspection of the solutions formed. By-pass pipes 21 with valves 22 can be utilized to add water to the solutions and thus modify the concentration thereof. When water is permitted to flow under the pressure indicated through the nozzles 15 a partial vacuum is induced in the suction chambers 16 at the same time for the pressure of the water is materially reduced. If the hoppers are filled or partially filled with the dry materials containing the foam-forming ingredients the latter will be drawn into the streams and mingled therewith to produce the solutions efficiently and continuously. These solutions when combined in the conduit 9 will provide the desired foam and the latter can be directed as desired by manipulation of the nozzle 11. The degree of suction is controlled by manipulation of the valves 13 to vary the proportions of the dry materials entering the stream and the consistency of the foam. Further control is obtained by supplying water through the by-pass pipes 21 and water can be added also to the conduit 9.

In Fig. 3 of the drawing substantially the same structure is employed with the addition of pumps in this case to boost the pressure of the water flowing to the nozzles of the ejectors. Pipes 23 may be connected to a source of water which may or may not be under pressure, valves 24 being disposed in the pipes to control the flow of water therethrough. A pump 25 is connected to each of the pipes 23 and is driven by a gas engine, electric motor or other suitable source of power. The pumps may be of the centrifugal or positive rotary type. The outlet 26 of each pump is connected to an ejector 27 having a nozzle 28, a suction chamber 29 and a nozzle 30. The hoppers 5 and 6, which are adapted to contain a supply of the dry materials, communicate respectively with the suction chambers. The pipes 7 and 8 are connected to the ejectors and deliver the solutions to the conduit 9. Valves 31, test cocks 32 and by-pass pipes 33 with valves 34 are provided as in the preceding embodiment of the invention. When the water and the dry materials are supplied and when the pumps are in operation the water is forced through the ejectors, creates the necessary suction and draws in the required supply of dry materials which are mingled with the water to form solutions which subsequently react to produce foam. By varying the speed of the pumps the degree of suction developed by the ejectors can be modified to change the consistency of the foam by varying the proportions of the dry materials which are delivered to the streams of water.

In Fig. 4 the suction sides of the pumps are applied to the outlets from the ejectors. Pipes 36 with controlling valves 37 are connected to a source of water under pressure and to ejectors 38 having nozzles 39, suction chambers 40 and nozzles 41. The hoppers 5 and 6, adapted to contain supplies of the dry materials, communicate with the suction chambers. Pumps 42 of the centrifugal or positive rotary type are driven from a gas engine, electric motor or other source of power 43 having means for regulating the speed thereof so that the degree of suction exerted by the pumps can be regulated. The pumps are connected to the pipes 7 and 8 which deliver the solutions to the conduit 9 where they are mingled to produce foam. Valves 44, test cocks 45 and by-passes 46 with valves 47 can be provided for the purposes hereinbefore mentioned. The suction created by the pumps and/or by the ejectors causes the dry materials to flow continuously into the suction chambers and there to mingle with and dissolve in the flowing streams of water. The mixing of the dry materials with the water is facilitated by the action of the pumps so that a uniform foam can be produced continuously and delivered as required.

Each of the forms of the apparatus as illustrated and described herein depends upon the principle of subjecting the separated dry materials containing foam-forming and stabilizing ingredients to suction concurrently with the introduction thereof to the water. The application of suction to the dry materials prevents the clogging of the apparatus, ensures a uniform flow and permits the regulation of the proportions of dry materials which are added to the water so that foam of the desired consistency can be produced. It avoids all defects inherent in the introduction of dry materials with mechanical devices or the use of an air blast with the resulting introduction of oxygen to the foam.

Various changes may be made in the details of construction of the apparatus and in the size and method of operation thereof without departing from the invention or sacrificing any of the advantages set forth.

I claim:—

1. The method of producing and delivering fire-extinguishing foam which consists in establishing separate streams of water in suitable conduits, continuously and simultaneously delivering from separate and external sources by the suction effect produced by the streams a dry material including as a reacting chemical only an acid reagent into one stream and a dry material including as a reacting chemical only a basic reagent into the other in proportions substantially constant with respect to each other and to the flow of water, one of the reagents including a foam-stabilizer, mingling the separate streams to permit initial reaction of the acid and basic reagents thereby producing foam, and conveying the mixture of foam and undissolved particles of the reagents through a conduit to the point of discharge of the foam.

2. An apparatus for producing fire extinguishing foam, comprising at least two conduits communicating with a common source of water supply for conducting water toward a point of discharge, one of the conduits having a sole hopper from which a dry foam reagent is delivered directly into the flowing water in the conduit, an ejector for causing the dry reagent to be drawn into the water by suction, hopper means from which another dry foam reagent and a foam stabilizer are delivered directly into the flowing water in another of the conduits, and ejector means for causing said second dry reagent and the stabilizer to be drawn into the water in the conduit by suction, the hopper and ejector and the hopper means and ejector means including means to effect the delivery of the reagents in proportions substantially constant with respect to each other and to the flow of water, said conduits converging together and being joined into a single conduit at the side of the hoppers opposite to the water supply to permit the initial intermingling of the reagents in the presence of the foam stabilizer.

3. An apparatus for producing fire extinguishing foam, comprising at least two conduits communicating with a common source of water supply for conducting water toward a point of discharge, one of the conduits having a sole hopper from which a dry foam reagent is delivered directly into the flowing water in the conduit, an ejector for causing the dry reagent to be drawn into the water by suction, hopper means from which another dry foam reagent and a foam stabilizer are delivered directly into the flowing water in another of the conduits, ejector means for causing said second dry reagent and the stabilizer to be drawn into the water in the conduit by suction, said conduits converging together and being joined into a single conduit at the side of the hoppers opposite to the water supply to permit the initial intermingling of the reagents in the presence of the foam stabilizer, and means for effecting the control of the rate of delivery of one reagent with respect to the other and the reagents jointly with respect to the rate of water flow, to thereby produce a stable gas filled foam.

4. A method of producing fire extinguishing foam, comprising establishing two streams of water communicating with a common source of water supply and flowing toward a common point of discharge, utilizing a sole exterior supply from which a dry foam reagent is delivered directly into one of the flowing streams and continuously effecting the said delivery of the reagent from said supply into the stream by suction action produced by the stream, utilizing exterior supply from which another dry foam reagent and a foam stabilizer are delivered directly into the other of the flowing streams and continuously effecting the said delivery of the second dry reagent and the stabilizer from said supply into the stream by suction action produced by the stream, the reagents being delivered into the respective streams in proportions substantially constant to each other and to the flow of water, joining said streams into a single stream at a point after the delivery of the reagents into the water to effect the initial intermingling of the reagents in the presence of the foam stabilizer and the production of a stable foam for fire extinguishing purposes.

In testimony whereof I affix my signature.

WALTER PALMER.